Aug. 31, 1965   H. W. ADAMS   3,204,021
VIBRATIONLESS CABLE CONSTRUCTION
Filed May 17, 1960   2 Sheets-Sheet 1

INVENTOR
HAROLD W. ADAMS
BY *Glenn & Jackson*
HIS ATTORNEYS

Aug. 31, 1965    H. W. ADAMS    3,204,021
VIBRATIONLESS CABLE CONSTRUCTION
Filed May 17, 1960    2 Sheets—Sheet 2

INVENTOR
HAROLD W. ADAMS
BY
Glenn & Jackson
HIS ATTORNEYS

United States Patent Office 3,204,021
Patented Aug. 31, 1965

3,204,021
VIBRATIONLESS CABLE CONSTRUCTION
Harold W. Adams, Henrico County, Va., assignor to Reynolds Metals Company, Richmond, Va., a corporation of Delaware
Filed May 17, 1960, Ser. No. 29,640
18 Claims. (Cl. 174—42)

This invention relates to an improved transmission cable, line and the like. The invention also relates to the method of making and/or installing such cable, line and the like.

This invention overcomes a previously known weakness of transmission cables which causes these cables to fatigue and break at the suspension towers where the cables are mounted on insulators. This failure results from cable vibration which is caused by wind blowing across the cable and setting up vibrations that become unduly violent when the cable has a natural period of vibration, or harmonic vibration thereof, which coincides with the period of the vibration produced by the wind. This more or less continuous vibration causes an almost continuous oscillating bending moment at the transmission tower support which fatigues the metal of the cable at the tower support with consequent failure of the cable at this point. This failure is particularly aggravated in the relatively large diameter cables which are made of aluminum containing metallic material.

It is believed that when low velocity winds of the order of two and one-half to fifteen miles per hour blow transversely across prior known cables or the like, eddies are created on the leeward side thereof which move from the upper to the lower side of the cable or the like at a steady rate. When the frequency of movement of these wind eddies corresponds to the natural frequency of vibration of the cable or the like or to a harmonic of the natural frequency, a resonant condition is created and the cable or the like will vibrate.

Attempts now being used to overcome this vibration weakness require workers which are skilled in the mathematics of the problem. These skilled workers endeavor to attach dampers on the cable at a selected distance from the tower supports in a manner which it is hoped will damp out these vibrations and thus prevent this costly failure.

This invention overcomes this weakness of transmission cables by providing a cable construction which has no harmonic vibration of a periodicy which might coincide with these wind induced vibrations. The cable construction may be installed by workers who need not be skilled in damper installation procedure. The installation according to this invention automatically and permanently solves and removes the vibration problem and provides a safe and satisfactory cable installation.

Generally, it has been found according to the teachings of this invention that a cable or the like can be made with a randomly varying weight throughout its length, or with a varying diameter throughout its length, or with both a randomly varying weight and a varying diameter throughout its length whereby a suspended length thereof will not tend to vibrate in low velocity winds because the same precludes the existence of a resonant condition.

For example, it has been found that the natural frequency of cable vibration is a function of its unit weight and that the frequency of input energy from the wind is a function of the cable diameter. By thus constructing a cable with a randomly varying weight along its length, the cable does not have a natural frequency of vibration, and by constructing a cable with a varying diameter, the cable does not have a fixed frequency of input energy. In this manner, the structure of the cable precludes the existence of a resonant system necessary before vibration can occur.

Further, it was found according to the teachings of this invention that a mass having a high mechanical hysteresis characteristic can be added to and within a cable construction or the like to absorb energy of movement thereof and, thus, dampen aeolian vibrations, the mass dissipating the absorbed energy in the form of heat. In this manner, the mass prevents the build-up of any consequential amplitude of vibration even though a resonant condition should exist.

Also, by adding such mass to the other cable construction of this invention, any vibration movements thereof are dampened by the mass whereby such cable constructions of this invention are rendered more vibrationless.

Thus each cable construction of this invention has at least one or more of the following features which render the same substantially vibrationless when suspended in low velocity winds:

(1) A randomly varying weight throughout its length;
(2) a varying diameter throughout its length;
(3) mass having a high mechanical hysteresis characteristic added thereto throughout its length to absorb energy of movement thereof.

Accordingly, it is an object of this invention to provide a cable construction or the like that is substantially vibrationless when suspended in low velocity winds.

It is another object of this invention to provide a method for making such a cable construction or the like.

Another object of this invention is to provide a cable construction or the like having one or more of the novel features described and/or shown herein.

Another object of this invention is to provide a method for making a cable construction or the like as set forth in the preceding object.

Other objects, uses and advantages of this invention are apparent from this description and/or from the accompanying drawings forming a part thereof and wherein.

Figure 1:
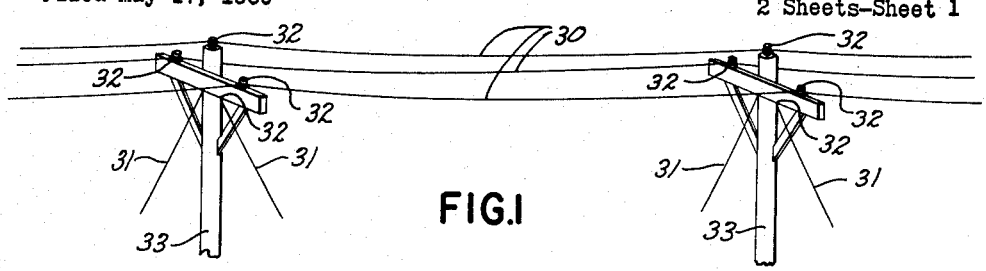
FIGURE 1 is a perspective view illustrating various suspended cable constructions.

FIGURE 1 illustrates a transmission cable installation which is emblematic of many installations of various types to which this invention is applicable. If the cable installation is made according to previous practice, the cables 30 and guy wires 31 will vibrate and thus fatigue and break at the insulators or tower suspension points 32 of the towers or poles 33 at an unduly early period of time. Skilled workers may be used to attempt to prevent such failures by skilled installation of damping devices. These workers may err and thus may fail to prevent such failure.

However, if the installation of FIGURE 1 is made according to this invention, such breakage at the suspension points 32 is automatically prevented in an effective and sure manner, and without the use of the skilled labor previously required.

While FIGURE 1 illustrates a general arrangement of suspended cables or the like, it is to be understood that there are many applications where cables or the like are suspended in the wind, and FIGURE 1 is merely to indicate one such arrangement wherein the various vibrationless cable constructions of this invention can be utilized and is not intended to be a limitation thereto.

Figure 2:
FIGURE 2 is a fragmentary side view of one cable construction of this invention.

The cable construction 34 illustrated in FIGURE 2 is one embodiment of this invention and comprises a plurality of layers of metal strands spirally wound upon themselves or upon a suitable core (not shown) to define an elongated cylindrical metal construction 35.

To render the construction 35 substantially vibrationless to low velocity winds, any suitable means are added to the outer periphery thereof at irregular intervals throughout its length and in varying degrees of thicknesses and widths to not only randomly vary the diameter of the construction 35 throughout its length but to also randomly vary the weight thereof. In the embodiment illustrated in FIGURE 2, a suitable tape 36 is applied and secured to the outer periphery of the cable construction 35 in laminated sections 37 of varying widths and thicknesses and at irregular intervals along the length of the construction 35.

Thus, it can be seen that the cable construction is rendered substantially vibrationless to winds, and particularly low velocity winds, as the same has a randomly varying weight throughout its length as well as a randomly varying diameter throughout its length whereby a resonant condition thereof is precluded.

Figure 3:
FIGURE 3 is a view similar to FIGURE 2 and illustrates another cable construction of this invention.

The cable construction 38 illustrated in FIGURE 3 comprises a plurality of layers of metal strands spirally wound upon themselves or upon a suitable core (not shown) with a plurality of laminated taped sections 39 disposed between adjacent layers of the metal strands. The taped sections 39 randomly vary in height and width and are spaced at irregular intervals to render the cable construction 38 substantially vibrationless to winds, and particularly low velocity winds, in substantially the same manner as the taped sections 37 of FIGURE 1.

It is to be understood that any other suitable means can be substituted for the taped sections 39 whereby the cable construction 38 will have a randomly varying weight and diameter throughout its length.

Figure 4:
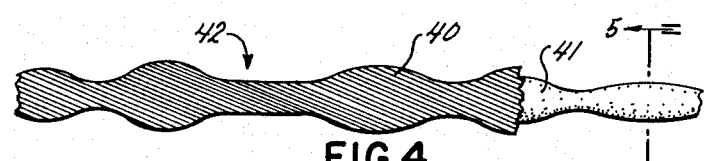
FIGURE 4 is fragmentary, a partially broken away view of still another cable construction of this invention.

As illustrated in FIGURE 4, a plurality of metal strands 40 are spirally wound upon a core 41 formed of any suitable material having a high mechanical hysteresis characteristics, such as butyl rubber or the like. The core 41 is provided with a randomly varying cross-sectional configuration whereby the resulting cable construction 42 has a randomly varying weight and diameter throughout its length.

Since the core 41 s formed from a mass having a high mechanical hysteresis characteristic, any movement of the strands 40 relative to each other, should the cable construction 42 vibrate, is absorbed by the core 41, the core 41 flexing to absorb the energy of movement and dissipating the absorbed energy in the form of heat.

Thus, the randomly varying weight and diameter of the cable construction 42 precludes the existence of a resonant condition, and even if the cable construction should vibrate, the mass 41 will absorb such movements and thereby dampen the vibrations.

Figure 5:
FIGURE 5 is an axial cross-sectional view taken on line 5—5 of FIGURE 4.
Figure 6:
FIGURE 6 is a view similar to FIGURE 5 and illustrates another embodiment of this invention.
Figure 7:
FIGURE 7 is also a view similar to FIGURE 5 and illustrates another embodiment.

While the core 41 is illustrated as being formed of a solid mass in FIGURE 5, it is to be understood that the core 41 can be made more flexible, if desired. For example, the core 41a, FIGURE 6, is provided with a central bore 43 whereby the remaining annulus of the resilient material has a greater amount of room to flex when the strands 40 move relative to each other. Similarly, the core 41b, FIGURE 7, is provided with a plurality of bores or air pockets 44 to render the core 41b more flexible.

If desired, the core 41 can be made of a non-flexible material whereby the resulting cable construction would still be substantially vibrationless because the randomly varying diameter and weight throughout its length prevent the existence of a resonant condition.

Figure 9:
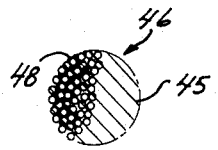
FIGURE 9 is an axial cross-sectional view taken on line 9—9 of FIGURE 8.
Figure 8:
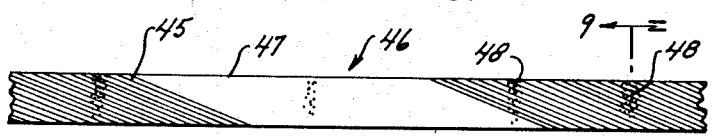
FIGURE 8 is a fragmentary side view of another cable construction of this invention.

A plurality of metal strands 45 are wound upon themselves in FIGURES 8 and 9 to provide a solid cylindrical cable construction 46 having an outer periphery 47. However, it is to be understood that the strands 45 may be wound upon any suitable core, if desired.

To render the cable construction 46 substantially vibrationless, a suitable mass 48 having a high mechanical hysteresis characteristics, such as butyl rubber or the like, is impregnated between the strands 45 and within the outer periphery 47 thereof at irregular intervals along the length thereof and in random quantities.

In this manner the cable construction 46 is provided with a randomly varying weight throughout its length to preclude the existence of resonant condition. Further, any interstrand movements, should the cable construction 46 vibrate, are absorbed by the mass 48 whereby the cable construction 46 is rendered substantially vibrationless to winds, and particularly low velocity winds.

Figures 10, 11:
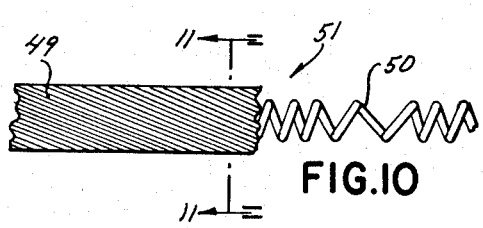
FIGURE 10 is a fragmentary partially broken away side view of another cable construction of this invention.
FIGURE 11 is an axial cross-sectional view taken on line 11—11 of FIGURE 10.

In the embodiment illustrated in FIGURES 10 and 11, a plurality of metal strands 49 are spirally wound upon a spiral core 50 formed of any suitable material, such as metal or the like, and defining a cylinder whereby the resulting cable construction 51 has a uniform outer diameter throughout its length. However, the spiral core 50 has randomly varying spaces between adjacent convolutions thereof throughout its length to provide a randomly varying weight of the cable construction 51 throughout its length.

In this manner the cable construction 51 is rendered substantially vibrationless to winds, and particularly low velocity winds, and further, the resilient core 50 tends to absorb the energy of interstrand movement to dampen any vibrations thereof.

Figure 12:
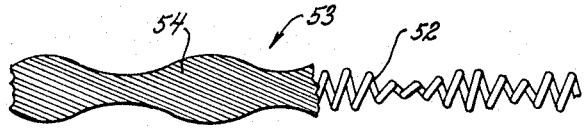
FIGURES 12–15 are respectively fragmentary side views, partially broken away, and respectively illustrate other cable constructions of this invention.

The core 50 can also provide a randomly varying diameter of the cable construction 51 throughout its length by having randomly varying convolutions of different outer and inner diameters in the same manner as the spiral core 52 of the cable construction 53 illustrated in FIGURE 12.

In particular, the cable construction 53 comprises a plurality of metal strands 54 spirally wound upon a spiral core 52 having a randomly varying cross-sectional configuration throughout its length whereby the outer periphery of the cable construction has a randomly varying diameter throughout its length. Further, the cable construction 53 has a randomly varying weight throughout its length as the weight of the core 52 randomly varies throughout its length. As previously stated, this randomly varying weight and diameter renders the cable construction 53 substantially vibrationless to winds, and particularly low velocity winds, as a resonant condition is prevented.

Figure 13:
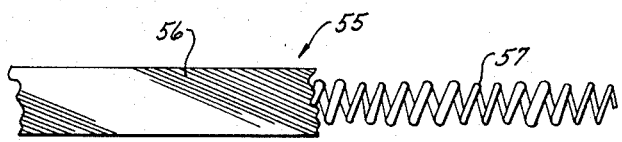

The cable construction 55, FIGURE 13, comprises a plurality of metal strands 56 spirally wound upon a spiral core 57 having convolutions of randomly varying cross-sectional configurations although the same define a uniform outer diameter of the cable construction 55 throughout its length. Thus, the cable construction 55 is rendered substantially vibrationless as the core 57 thereof has a randomly varying weight throughout its length.

Figure 14:
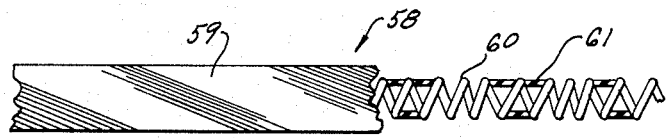

Each of the cable constructions 51, 53 and 55 of FIGURES 10, 12 and 13, respectively, can include a mass having a high mechanical hysteresis characteristic in the manner illustrated in FIGURE 14 whereby the resiliency of the respective spiral core is greatly enhanced to absorb any interstrand movements thereof while further randomly varying the weight of the particular cable construction throughout its length.

In particular, the cable construction 58, FIGURE 14, comprises a plurality of metal strands 59 disposed upon a spiral core 60, the core 60 being similar to the core 50 of FIGURE 10 but may be similar to the cores 52 and 57 of FIGURES 12 and 13 respectively, as desired. Mass 61, having a high mechanical hysteresis characteristic, is randomly disposed between certain of the convolutions of the core 60 throughout its length to not only further randomly vary the weight of the cable construction 58 throughout its length but to also assist the core 60 in absorbing interstrand movement should the cable construction 58 vibrate.

Figure 15:
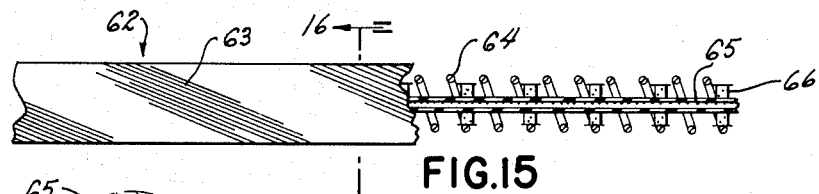
Figure 16:
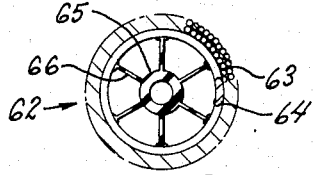
FIGURE 16 is an axial cross-sectional view taken on line 16—16 of FIGURE 15.
Figure 17:
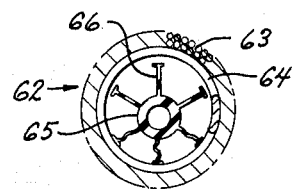
FIGURE 17 is a view similar to FIGURE 16 and illustrates the vibration dampening feature of this invention.

Another substantially vibrationless cable construction 62 of this invention is illustrated in FIGURES 15–17 and comprises a plurality of metal strands 63 spirally wound upon a uniform spiral core 64. It is to be understood that the core 64 may be formed in any of the previously described configurations as desired.

An elongated hollow mass or body 65 formed of any suitable material having a high mechanical hysteresis characteristic, such as butyl rubber or the like, is disposed within the hollow cable construction 62 and has a plurality of radially disposed, flexible spider legs 66 pressing against the spiral core 64 and normally maintaining the body 65 centrally disposed within the cable construction 62 as illustrated in FIGURE 16.

However, when the cable construction 62 tends to vibrate or move, the body 65 tends to remain stationary and the movement of the outer portions of the cable construction 62 relative to the body 65 causes the legs 66 to flex as illustrated in FIGURE 17. This flexure of the legs 66 tends to dampen the vibrations and/or movements of the cable construction 62 as the legs 66 absorb the energy of movement and dissipate the absorbed energy in the form of heat.

While the body 65 is illustrated as being utilized with a spiral core 64 in FIGURES 15–17, it is to be understood that the same may be utilized by itself.

Figure 18:
FIGURE 18 is a fragmentary cross-sectional view illustrating another cable construction of this invention.

For example, the cable construction 67, FIGURE 18, includes a plurality of metal strands 68 spirally wound to define a hollow construction having an internal peripheral surface 69. The elongated body 65a is disposed within the strands 68 and has the legs 66a thereof normally engaging the internal peripheral surface 69 and maintaining the body 65a centrally disposed within the cable construction 67. Thus, the body 65a and its interconnected legs 66a function in the same manner as the body 65 and legs 66 previously described to render the cable construction 67 substantially vibrationless when suspended in low velocity winds.

Figure 19:
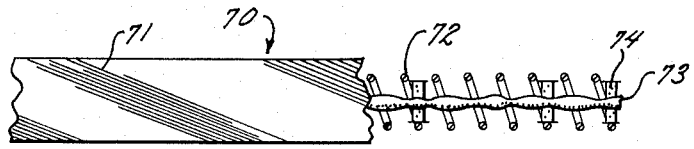
FIGURE 19 is a fragmentary and partially broken away side view of still another cable construction of this invention.

To further render the cable constructions 62 and 67 of FIGURES 15 and 18, respectively, more vibrationless, the body 65 and 65a and legs 66 and 66a can be constructed in the manner illustrated in FIGURE 19 whereby the particular cable construction has a randomly varying weight throughout its length.

In particular, the cable construction 70 of FIGURE 19 includes a plurality of metal strands 71 spirally wound upon a spiral core 72, the core 72 being similar to the core 64, FIGURE 15, but may be similar to the other spiral cores of this invention, as desired.

An elongated mass or body 73 is disposed within the cable construction 70 and has a plurality of flexible lags 74 normally tending to maintain the body 73 centrally disposed relative to the strands 71. The body 73 is so constructed and arranged that the same has a randomly varying cross-sectional configuration throughout its length whereby the cable construction has a randomly varying weight throughout its length. If desired, the spider legs 74 of the body 73 may be randomly disposed at irregular intervals along the length of the body 73 to assist in randomly varying the weight of the cable construction 70.

It is to be understood that various features of each of the above described cable constructions may be utilized with other features of the other cable constructions in various combinations thereof. For example, the impregnating means 48 of FIGURES 8 and 9 may be utilized with all other cable constructions described, if desired.

Further, while the cable constructions 34, 38, 42 and 53 of FIGURES 2, 3, 4 and 12, respectively, are illustrated as having randomly varying diameters as well as randomly varying weight throughout their respective lengths, it is to be understood that each of these cable constructions can have a uniformly varying diameter throughout its length, if desired, to render the respective cable construction substantially vibrationless.

Accordingly, there has been provided various cable constructions which are substantially vibrationless when suspended in winds, and particularly low velocity winds, regardless of the length of the span thereof. These cable constructions are rendered substantially vibrationless because each cable construction includes at least one or more of the following features:

(1) A randomly varying weight throughout its length;
(2) a varying diameter throughout its length; and
(3) a mass having a high mechanical hysteresis characteristic added thereto to absorb energy of movement.

While the form of the invention now preferred has been disclosed in accordance with the requirements of the statutes, other forms may be used, all coming within the scope of the claims which follow.

What is claimed is:

1. A cable construction that is substantially vibrationless when suspended in the wind, said cable construction having resilient mass added thereto throughout its length said mass having a mechanical hysteresis characteristic to absorb energy of movement of said cable and dissipate said energy in the form of heat, said cable construction having a randomly varying weight per unit length thereof and a varying outer peripheral diameter throughout its length.

2. A substantially vibrationless cable construction as set forth in claim 1 wherein said cable construction comprises a metal construction defining an outer periphery thereof and said mass is disposed within said outer periphery.

3. A substantially vibrationless cable construction as set forth in claim 1 wherein said cable construction comprises a plurality of strands disposed on said mass, said mass providing said randomly varying weight per unit length of said cable construction and said varying diameter throughout the length of said cable construction.

4. A substantially vibrationless cable construction when suspended in the wind, said cable construction having a randomly varying weight per unit length thereof throughout the entire length of said cable construction, said cable construction including a plurality of strands arranged in layers to form said construction and means secured intermediate adjacent layers of said strands at irregular intervals along the length of said cable construction to provide said randomly varying weight per unit length of said cable construction.

5. A substantially vibrationless cable construction when suspended in the wind, said cable construction having a randomly varying weight per unit length thereof throughout the entire length of said cable construction, said cable construction including a plurality of strands disposed about a core, said core having a randomly varying cross-sectional configuration throughout its length to provide said randomly varying weight per unit length of said cable construction.

6. A substantially vibrationless cable construction when suspended in the wind, said cable construction having a randomly varying weight per unit length thereof throughout the entire length of said cable construction, said cable construction having a plurality of strands disposed about a spiral core, said core having randomly varying distances between certain of the convolutions thereof throughout its length to provide said randomly varying weight per unit length of said cable construction.

7. A substantially vibrationless cable construction when suspended in the wind, said cable construction having a randomly varying weight per unit length thereof throughout the entire length of said cable construction, said cable construction having a plurality of strands disposed about a spiral core, said core having a randomly varying cross-sectional configuration throughout its length to provide said randomly varying weight per unit length of said cable construction.

8. A substantially vibrationless cable construction when suspended in the wind, said cable construction having a randomly varying weight per unit length thereof throughout the entire length of said cable construction, said cable construction having a plurality of strands disposed about a spiral core, said core having means randomly disposed between adjacent convolutions of said core throughout its length to provide said randomly varying weight per unit length of said cable construction.

9. A substantially vibrationless cable construction when suspended in the wind, said cable construction having a randomly varying weight per unit length thereof throughout the entire length of said cable construction, said cable construction including a plurality of strands and means randomly impregnated between certain of said strands throughout the length of said cable construction to provide said randomly varying weight per unit length of said cable construction.

10. A cable construction that is substantially vibrationless when suspended in the wind, said cable construction having a randomly varying outer peripheral diameter throughout the length thereof.

11. A substantially vibrationless cable construction as set forth in claim 10 wherein said cable construction has an outer periphery and means are secured to said outer periphery at selected intervals along the length of said cable construction to provide said randomly varying diameter throughout the length of said cable construction.

12. A substantially vibrationless cable construction as set forth in claim 10 wherein said cable construction includes a plurality of strands arranged in layers to form said construction and means are secured intermediate adjacent layers of said strands at random intervals along the length of said cable construction to provide said randomly varying diameter throughout the length of said cable construction.

13. A substantially vibrationless cable construction as set forth in claim 10 wherein said cable construction includes a plurality of strands disposed on a core, said core having a randomly varying cross-sectional configuration throughout its length to provide said varying diameter throughout the length of said cable construction.

14. A substantially vibrationless cable construction as set forth in claim 10 wherein said cable construction includes a plurality of strands disposed on a spiral core, said core having randomly varying sizes of convolutions throughout its length to provide said randomly varying diameter throughout the length of said cable construction.

15. A metal cable construction that is substantially vibrationless when suspended in the wind, said cable construction having an outer periphery, said cable construction having resilient mass added thereto throughout its length and within said outer periphery thereof, said mass having a mechanical hysteresis characteristic to absorb energy of movement of said cable construction and dissipate said energy in the form of heat, said resilient mass providing a randomly varying weight of said cable construction throughout the length thereof, said cable construction including a plurality of strands disposed about a spiral core, said mass being disposed between certain of the convolutions of said core.

16. A metal cable construction that is substantially vibrationless when suspended in the wind, said cable construction having an outer periphery, said cable construction having resilient mass added thereto throughout its length and within said outer periphery thereof, said mass having a mechanical hysteresis characteristic to absorb energy of movement of said cable construction and dissipate the energy in the form of heat, said resilient mass providing a randomly varying weight of said cable construction throughout the length thereof, said cable construction being hollow and said mass being disposed in said cable construction, said mass having a plurality of legs tending to maintain said mass spaced from said cable construction.

17. A metal cable construction that is substantially vibrationless when suspended in the wind, said cable construction having an outer periphery, said cable construction having resilient mass added thereto throughout its length and within said outer periphery thereof, said mass having a mechanical hysteresis characteristic to absorb energy of movement of said cable construction and dissipate said energy in the form of heat, said resilient mass providing a randomly varying weight of said cable construction throughout the length thereof, said cable construction being hollow and said mass being disposed in said cable construction, said mass comprising an elongated body having a plurality of radially disposed legs tending to maintain said body spaced from said cable construction.

18. A metal cable construction that is substantially vibrationless when suspended in the wind, said cable construction having an outer periphery, said cable construction having resilient mass added thereto throughout its length and within said outer periphery thereof, said mass having a mechanical hysteresis characteristic to absorb energy of movement of said cable construction and dissipate said energy in the form of heat, said cable construction including a plurality of strands, said mass being disposed between certain adjacent strands of said cable construction said adjacent strands being disposed in side by side relation and running in the same direction, said mass providing a randomly varying weight of said cable construction.

References Cited by the Examiner

UNITED STATES PATENTS

| | | | |
|---|---|---|---|
| 1,821,887 | 9/31 | Fowle | 174—131 |
| 1,999,502 | 4/35 | Hall | 174—129 |

(Other references on following page)

UNITED STATES PATENTS

| | | | |
|---|---|---|---|
| 2,060,859 | 11/36 | Flynt | 174—133 X |
| 2,225,334 | 12/40 | Daniels | 174—42 |
| 2,438,956 | 4/48 | Warner | 174—114 |
| 2,463,590 | 3/49 | Arutunoff | 174—126 X |
| 2,469,167 | 5/49 | Little | 174—42 |
| 2,564,463 | 8/51 | Burns | 174—42 |
| 2,729,054 | 1/56 | Peterson | 174—42 X |
| 2,778,870 | 1/57 | Nolan | 174—130 X |
| 2,969,416 | 1/61 | McGavern | 174—42 |
| 2,984,441 | 5/61 | Dalmasso | 174—42 X |

FOREIGN PATENTS

| | | |
|---|---|---|
| 939,277 | 4/48 | France. |
| 232,764 | 4/25 | Great Britain. |
| 331,220 | 10/35 | Italy. |

DARRELL L. CLAY, *Primary Examiner.*

BENNETT G. MILLER, JOHN P. WILDMAN, E. JAMES SAX, *Examiners.*